United States Patent Office 3,472,556
Patented Oct. 14, 1969

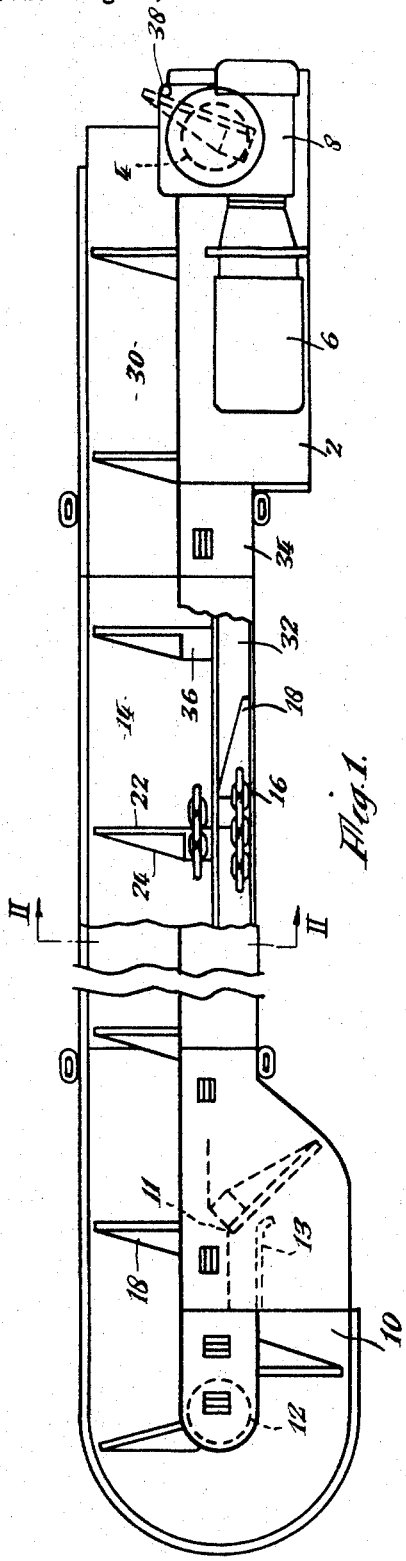
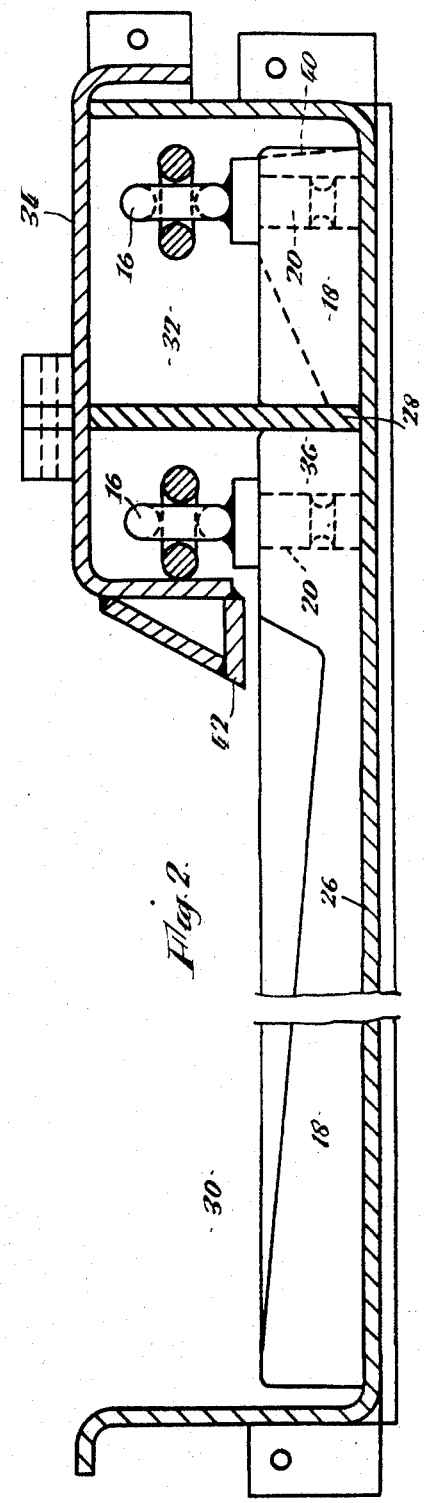

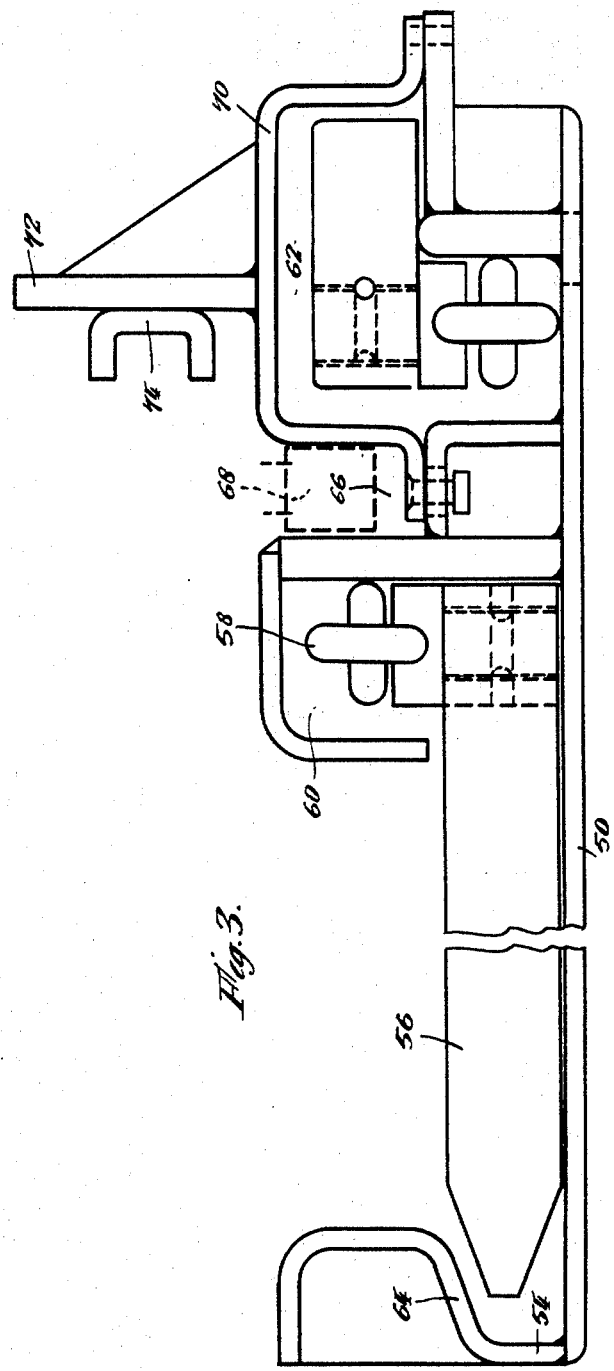

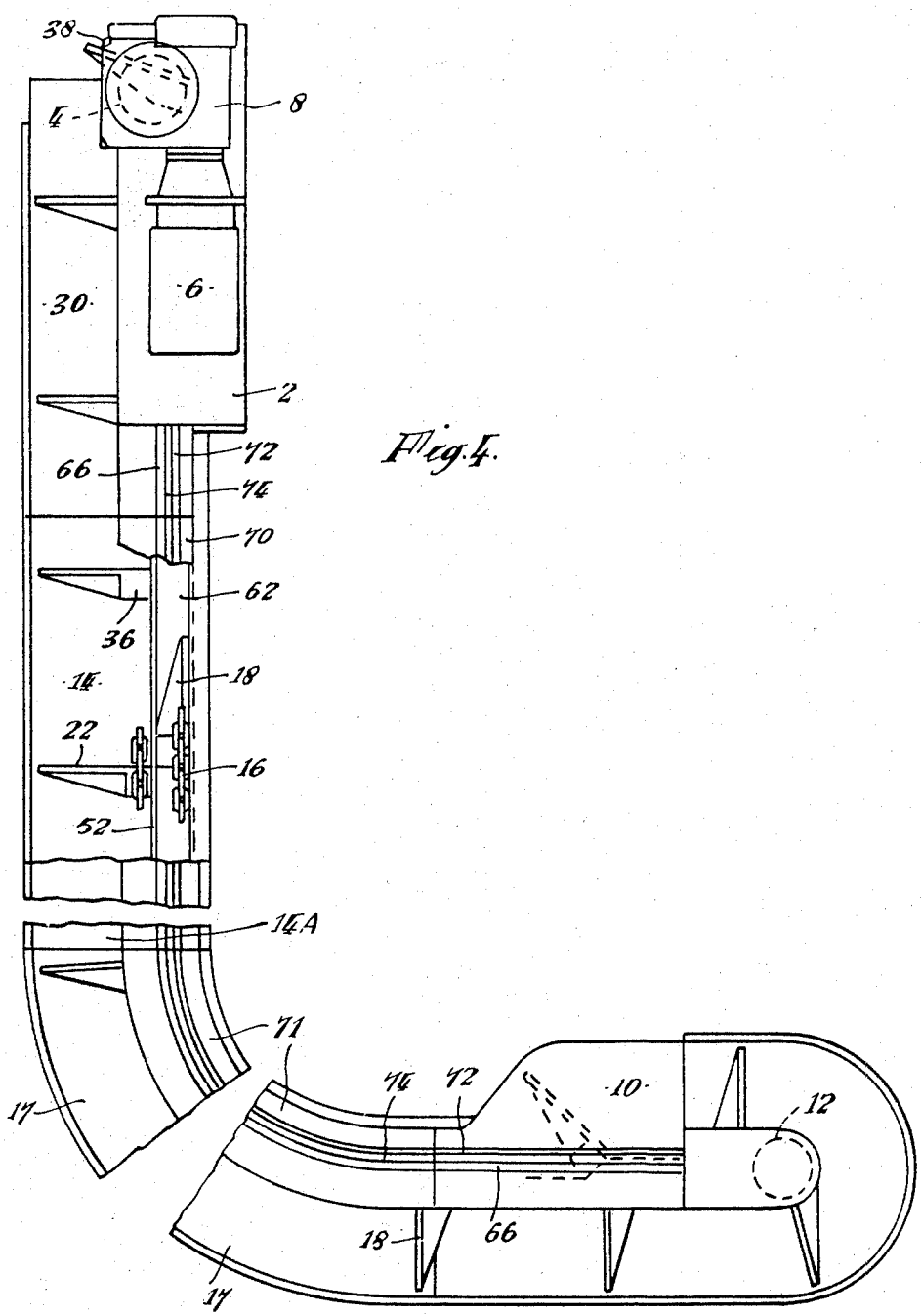

3,472,556
SCRAPER-CHAIN CONVEYORS
Robert Benjamin Bolton, 14 Middle Drive,
Ponteland, Northumberland, England
Filed Aug. 2, 1967, Ser. No. 657,883
Int. Cl. B65g 19/04; E21c 35/20
U.S. Cl. 299—43                                13 Claims

ABSTRACT OF THE DISCLOSURE

This invention provides a scraper chain conveyor which comprises a trough to receive the material being moved, an endless chain to one side of the trough extending therealong between a driving sprocket and a tension sprocket, a series of flights spaced along the chain and each pivotally attached at one end to the chain and having at said end a trailing portion to bear against a wall of the trough and so maintain the flight transversely to the trough throughout the driving run of the chain, means being provided to cause or permit the flights to rotate about the pivots at the completion of each driving run so that they assume a trailing attitude relative to the chain during the return run.

Advantageously, a channel in the form of a closed section is arranged alongside the trough to accommodate the return run of the chain and the trailing flights.

The conveyor may comprise at least one curved track portion, such curvature being formed by a series of arcuate portions or by a number of straight portions joined by arcuate portions of relatively small radius.

The frame of a conveyor according to the invention may further be adapted to provide a track for a mining machine with rotary cutting means, and further to provide guide means or housing for a static chain or cable along which the machine displaces itself and for electric cable, hydraulic hose and the like supply means connected to the machine, or to provide a track for a plough head with fixed cutters and guide means for a drag chain or cable to displace the plough.

---

This invention relates to scraper chain conveyors, particularly, but not exclusively, for the displacement of such material as broken stone, coal, or other mineral.

According to the invention, the conveyor comprises a trough to receive the material being moved, an endless chain to one side of the trough extending therealong between a driving sprocket and a tension sprocket, a series of flights spaced along the chain and each pivotally attached at one end to the chain and having at said end a trailing portion to bear against a wall of the trough and so maintain the flight transversely to the trough throughout the driving run of the chain, means being provided to cause or permit the flights to rotate about the pivots at the completion of each driving run so that they assume a trailing attitude relative to the chain during the return run.

The chain drive may comprise twin chains spaced apart such that the trailing portions of the flights can bear on the walls of the trough between the chains. A single chain construction has the advantage, however, that it can be made less susceptible to the ingress of foreign matter since it can then be arranged that the flight pivots extend downwardly to locate the flights below the chain, at least over the driving run of the chain.

To this end, it may also be arranged that a channel in the form of a closed section is arranged alongside the trough to accommodate the return run of the chain and the trailing flights.

A conveyor according to this invention may advantageous be adapted to enable the performance of a method of mining. To this end, the conveyor may comprise at least one curved track portion, such curvature being formed by a series of arcuate portions or by a number of straight portions joined by arcuate portions of relatively small radius. If necessary, rotary guide means such as idler sprockets or bollards may be provided for the chain at such arcuate portions.

Whether or not it is to be so employed, the frame of a conveyor according to the invention may further be adapted to provide a track for a mining machine with rotary cutting means, and further to provide guide means or housing for a static chain or cable along which the machine displaces itself and for electric cable, hydraulic hose and the like supply means connected to the machine, or to provide a track for a plough head with fixed cutters and guide means for a drag chain or cable to displace the plough.

The invention will now be more particularly described with reference to the accompanying drawings wherein:

FIG. 1 is a plan view of one form of conveyor according to the invention,

FIG. 2 is a section on the line II—II in FIG. 1,

FIG. 3 is a similar section of a second form of conveyor according to the invention, and FIG. 4 is a plan view of a modified form of conveyor.

Referring to FIGS. 1 and 2 of the drawings, the conveyor comprises a first terminal section 2 carrying a driving sprocket 4 driven by motor 6 through reduction gear 8 and an opposite terminal section 10 carrying a tension sprocket 12. Between these terminal sections are a series of straight intermediate sections 14 to make up the conveyor to its required length.

A single driving chain 16 extends between the sprockets 4, 12 and this carries a series of cantilever flights 18 attached at intervals along its length through pivot pins 20 secured to the chain. Each flight is of angular section with an upright leading face 22 and a trailing bottom web 24.

Apart from its end regions, the frame of the conveyor comprises a main channel-form section 26 divided by an upright web 28 into a relatively wide driving trough 30 and a relatively narrow return channel 32. A cover plate 34 of inverted U-section is dowelled to the web 28 to enclose the channel 32 and to screen a side region of the trough 30 within which the driving run of the chain 16 is located.

Each flight has an inner trailing portion 36 which bears against the web 28 as it travels along the driving run of the chain. Thus, the flight is constrained to project transversely to its direction of motion and entrain material in the trough to the delivery end of the conveyor at the terminal section 2. The web 28 terminates before reaching the driving sprocket 4 so that the constraint on each flight ends as the material it has entrained leaves the conveyor. More, as each unconstrained flight rounds the sprocket 4 it may strike a static pin 38 which rotates it about its pivot 20 so that it enters the channel 32 parallel to and under the chain. In this position it travels through the channel 32 with the return run of the chain until it is again swung out to its laterally projecting position by a projection 11 on the web 28 at the terminal section 10. Opposite this projection there is a wear pad 13 beneath a cover 15 over part of the section 10, which pad guides the chain to ensure that the flight is swung outwards before reaching the sprocket 12.

While reference has so far been made to the leading face 22 of each flight being upright it may be desirable to give it a slight rearwards slope as indicated at 40 in FIG. 2 which results in the angle between it and the bottom face being less than 90°. By this means, any tendency of the flight to lift due to the load imposed by the material being conveyed is minimised. Similarly in consideration of such loads, it may be arranged that the free end of the flight leads slightly under no-load conditions.

A further measure for restraining lifting of the flights is extension 42 projecting over the flights from a lower region of one side flange of the cover plate 34.

It will be appreciated that small segmental sections having an angular extent of between 5° and 15° perhaps, can be provided between the intermediate sections 14 to from a curved track. If necessary these additional sections can comprise guide means such as rollers or bollards to carry the chain around the angle. It is similarly possible to connect the conveyor sections so as to provide an inclined track, e.g. so that the delivery end is upwardly inclined to a horizontal discharge portion but in this case, if the angular change between sections is sufficiently small, the change can be effected by simple packing or distance pieces.

The alternative form of conveyor shown in FIG. 3 also illustrates means for combining the conveyor with a mineral cutting machine such as a coal cutter.

The construction comprises a base plate 50 on which a conveyor trough is formed between inner wall 52 and outer wall 54. As in the first example, flights 56 are pivoted to a single endless chain 58 which is accommodated in a downwardly open channel section 60 along its driving run. The return run of the chain and the retracted flights are accommodated in a closed-secton passage 62 but in this case the chain and flights have their positions inverted, they being rotated through 180° in the vertical plane at each terminal section of the conveyor.

The drawing illustrates a further feature intended to limit lifting of flights, namely, laterally extending lip 64 under which the free tips of the flights are located.

It will be seen that a recess 66 is provided between the channel section 60 and the passage 62 and this affords a track for guide means 68 of a cutting machine. Furthermore, cover plate 70 of the passage 62 has a vertical guide rail 72 secured to it which can be employed together with or alternatively to the track recess 66. The drawing also shows a forwardly open channel section 74 secured to the rail 72 to house a static tensile member such as a chain or cable along which the cutting machine can displace itself or to house a drag chain or cable for a plough cutter. An upwardly open channel can also be secured to the conveyor structure to support electric cable and/or hydraulic hose to the cutting machine.

The conveyor shown in FIG. 4 which includes components as above described and identified by the like reference numerals, is modified by the insertion, between a terminal straight section 14A and the section 10 which houses the tension sprocket 12, of a curved track portion including a plurality of arcuate sections 17. Each of these arcuate portions has a radial section substantially as shown in FIG. 3, the straight covers 70 being replaced of course by arcuate covers 71 each of which has a continuation of the guide recess 66, the guide rail 72 and the channel section housing 74 for a static tensile member for a cutting machine, which may thus be worked around the curve. The curved track portion may evidently include at least one straight section 14 interposed between the arcuate sections 17.

Obviously, another similar curved track portion may also be provided at the opposite end of a straight run of sections 14, extending along a straight coal face, said other curved portion serving to bring the driving terminal section 2 round so that it is disposed substantially at right angles to said coal face and parallel to the section 10.

The conveyors described above avoid a disadvantage of known scraper-chain conveyors of the kind wherein the return run passes beneath the operating run. An effect of this arrangement is that dust and small particles of the mineral inevitably fall into the housing of the return run, so that a substantial quantity of the material is carried towards and accumulates at the end of the conveyor remote from the delivery end. By locating the return run of the chain beside instead of beneath the operating run, it may be virtually completely enclosed, while the flights are in a traiilng and ineffective attitude, so that both seepage of dust and particles into the return channel, and displacement thereof in said channel away from the delivery end of the conveyor, is substantially reduced or minimised.

Another advantage of the illustrated constructions is that the base of the trough is a plate lying upon the floor of the mine gallery, so that the coal has to be lifted for transfer into the trough, only by the height of the wall of that trough, and not, as in the known conveyors, by the additional height of the under-lying return run and its housing or casing. Moreover, access to the return run for insepction or repair is obtainable simply by removal of a section of its cover.

What I claim and desire to protect by Letters Patent is:

1. A scraper chain conveyor comprising a trough to receive the material being moved, an endless chain one run of which lies along one side of the trough, a series of pivot pins on the chain and extending downwardly therefrom, a series of flights spaced along the chain and each pivotally attached at one end to a respective one of the pivot pins so that said end lies beneath the chain, and having at that end a trailing portion to bear against a wall of the trough and so maintain the flight transversely to the trough throughout the driving run of the chain, sprockets for the chain at the delivery end and at the return end of the conveyor, at least the sprocket at the delivery end being supported from above to leave a clear space underneath for the passage of the flights, and means enabling the flights to rotate about the pivot pins at the completion of each driving run so that substantially the whole of each flight passes under the sprocket away from the material being delivered by the conveyor, and is caused to assume a trailing attitude relative to its pivot during the return run.

2. A conveyor according to claim 1, wherein a channel of closed section is arranged alongside said trough to accommodate the return run of the chain and the trailing flights.

3. A conveyor according to claim 2, wherein said channel has a cover to form a closed section.

4. A conveyor according to claim 3, wherein said cover is constructed to afford guide means for a mineral cutting machine movable parallel to the track of the trough.

5. A conveyor according to claim 1 wherein the driving run of the chain is accommodated in a channel having a downwardly extending flange between the main region of the trough and the chain, this flange providing an abutment for the flights limiting upward pivoting thereof along the driving run of the chain.

6. A conveyor according to claim 5, wherein said channel comprises a downwardly extending flange between the main region of the trough and the chain, an extension projecting laterally from said flange at its lower region forming a confining abutment for the flights limiting upward pivoting thereof along the driving run of the chain.

7. A conveyor according to claim 1, further comprising on one side of the trough section remote from the driving chain, a laterally extending lip under which the tips of the flights are located to limit upwards movement of the flights.

8. A conveyor according to claim 1, wherein each flight comprises an upright forward face extending across the trough and arranged to bear upon the material being moved, and a rearwardly extending bottom face arranged to bear on the trough bottom.

9. A conveyor according to claim 8, wherein the angle between said faces is less than 90°.

10. A conveyor according to claim 1, wherein said flight trailing portions are arranged to set the angle between the leading face of each flight and the trough axis, under no-load conditions, at less than 90° so that the free end of each flight leads slightly.

11. A conveyor according to claim 1, wherein the conveyor includes at least one curved track portion, said trough comprising a series of arcuate portions.

12. A conveyor according to claim 1, further comprising guide means for a mineral cutting machine movable parallel to the track of the trough.

13. A conveyor according to claim 12, further comprising a housing which is provided on the conveyor structure for a static tensile member along which said machine is arranged to displace itself.

References Cited
UNITED STATES PATENTS

| | | | |
|---|---|---|---|
| 2,676,696 | 4/1954 | Gerhartz | 198—171 X |
| 2,736,420 | 2/1956 | McCarthy. | |
| 2,773,584 | 12/1956 | Densmore | 198—170 |
| 3,217,857 | 11/1965 | Ellis | 198—170 X |

FOREIGN PATENTS

| | | |
|---|---|---|
| 548,455 | 10/1942 | Great Britain. |
| 693,752 | 7/1940 | Germany. |

EDWARD A. SROKA, Primary Examiner

U.S. Cl. X.R.

198—170, 171